(12) United States Patent
Hsueh

(10) Patent No.: US 12,453,437 B2
(45) Date of Patent: Oct. 28, 2025

(54) GROUP HEAD VORTEX SHOWER

(71) Applicant: I CHERNG REFRIGERATION INDUSTRIAL CO., LTD., Kaohsiung (TW)

(72) Inventor: Po-Yang Hsueh, Kaohsiung (TW)

(73) Assignee: I CHERNG REFRIGERATION INDUSTRIAL CO., LTD., Kaohsiung (TW)

( * ) Notice: Subject to any disclaimer, the term of this patent is extended or adjusted under 35 U.S.C. 154(b) by 301 days.

(21) Appl. No.: 18/209,122

(22) Filed: Jun. 13, 2023

(65) Prior Publication Data

US 2024/0306837 A1    Sep. 19, 2024

(30) Foreign Application Priority Data

Mar. 15, 2023  (TW) .................................. 112109497

(51) Int. Cl.
*A47J 31/44*    (2006.01)
(52) U.S. Cl.
CPC .................................. *A47J 31/4478* (2013.01)
(58) Field of Classification Search
CPC .......................... A47J 31/0631; A47J 31/4478
See application file for complete search history.

(56) References Cited

U.S. PATENT DOCUMENTS

| | | | | |
|---|---|---|---|---|
| 1,803,356 | A * | 5/1931 | Richheimer | A47J 31/44 |
| | | | | 99/314 |
| 3,935,805 | A * | 2/1976 | Ihlenfeld | A47J 31/4478 |
| | | | | 99/300 |
| 5,477,775 | A * | 12/1995 | Delhom | A47J 31/4478 |
| | | | | 99/305 |
| 6,755,119 | B1 * | 6/2004 | Lyall | A47J 31/4478 |
| | | | | 99/302 R |

(Continued)

FOREIGN PATENT DOCUMENTS

| | | | | |
|---|---|---|---|---|
| CN | 214964594 U | 12/2021 | | |
| EP | 1502526 A2 * | 2/2005 | | A47J 31/0631 |

(Continued)

OTHER PUBLICATIONS

Search Report appended to an Office Action, which was issued to Taiwanese counterpart application No. 112109497 by the TIPO on Aug. 8, 2023, with an English translation thereof.

(Continued)

*Primary Examiner* — Woody A Lee, Jr.
(74) *Attorney, Agent, or Firm* — MUNCY, GEISSLER, OLDS & LOWE, P.C.

(57) ABSTRACT

A group head vortex shower is used in a coffee machine and includes a bottom wall, a surrounding wall and a reflection wall. The surrounding wall extends from the bottom wall, surrounds a central axis, cooperates with the bottom wall to define a water inlet space, and has a plurality of outer outlets that are in fluid communication with the water inlet space. The reflection wall is sleeved around the surrounding wall, (Continued)

and has at least one curved inner surface that surrounds the central axis. Each of the outer outlets outputs a water jet from the water inlet space in a water outlet direction towards the at least one curved inner surface of the reflection wall. An imaginary extension line of each of the outer outlets and the central axis are skew lines.

12 Claims, 11 Drawing Sheets

(56) References Cited

U.S. PATENT DOCUMENTS

| | | | |
|---|---|---|---|
| 7,429,005 B2* | 9/2008 | Schapper | B05B 1/262 239/436 |
| 9,084,511 B2* | 7/2015 | Clark | A47J 31/4478 |
| 10,194,768 B2* | 2/2019 | Van Der Woning | A47J 31/4478 |
| 2011/0094393 A1 | 4/2011 | Clark et al. | |
| 2019/0104881 A1 | 4/2019 | Foglia | |

FOREIGN PATENT DOCUMENTS

| | | | |
|---|---|---|---|
| FR | 2634365 A1 * | 1/1990 | A47J 31/0631 |
| JP | WO2006129373 A1 * | 12/2008 | A47J 31/4478 |
| TW | I712386 B | 12/2020 | |
| TW | M642140 U | 6/2023 | |
| WO | 2021239389 A1 | 12/2021 | |

OTHER PUBLICATIONS

Search Report issued to European counterpart application No. 23173554.9 by the EPO on Oct. 30, 2023.

* cited by examiner

GROUP HEAD VORTEX SHOWER

CROSS-REFERENCE TO RELATED APPLICATION

This application claims priority to Taiwanese Invention Patent Application No. 112109497, filed on Mar. 15, 2023.

FIELD

The disclosure relates to a group head shower, and more particularly to a group head vortex shower.

BACKGROUND

Referring to FIG. 1, a conventional coffee machine 9 includes a water supply unit 91 that provides water for extracting coffee, and an extraction unit 92 that is removably mounted on the water supply unit 91 and that is adapted to hold ground coffee. The water supply unit 91 is able to supply a sufficient amount of water with a suitable temperature and pressure for extracting coffee. However, the water supply unit 91 requires complex machinery in order to control the temperature and pressure parameters of the water so that the supplied water is optimal for coffee extraction. The conventional coffee machine 9 therefore requires a lot more space to house the more complex machinery of the water supply unit 91. Therefore the conventional coffee machine 9 has the disadvantage of taking up too much space, and being less convenient to use.

Referring to FIG. 2, a second conventional coffee machine, includes a water inlet unit 1 that supplies water, and an extraction unit 2 that is connected to the water inlet unit 1 to be in fluid communication with the water inlet unit 1. The extraction unit 2 includes a body 21 defining an inner space 20, a portafilter basket 22 that is disposed in the inner space 20 and that is adapted to receive ground coffee, and a water distribution module 23 that is in liquid communication with the water inlet unit 1. The water diffusion module 23 is used to adjust the relevant parameters of the water according to required specifications. Further referring to FIG. 3, the water distribution module 23 includes a disc body 231 that defines an inlet hole 230, a group head shower screen 232 that is attached to the disc body 231 and that has a central through hole 39, and a group head diffusion screw 233 that has a diffusion hole 235. The group head diffusion screw 233 is screwed into the inlet hole 230 of the disc body 231 through the group head shower screen 232 and secures the group head shower screen 232 to the disc body 231. The water supplied by the water inlet unit 1 is able to diffuse from the diffusion hole 235 of the group head diffusion screw 233 through the group head shower screen 232 and reach the portafilter basket 22 evenly.

However, although the water diffusion distribution 23 can diffuse water via the group head shower screen 232 to evenly percolate downward into the portafilter basket 22, the group head shower screen 232 causes the water to flow through a plurality of vertically open pores (not shown), so that the water can only diffuse vertically downward and cannot agitate the ground coffee in the portafilter basket 22 transversely to achieve better extraction of the ground coffee. Additionally, it should be noted that the coffee extraction process is pressurized, which means residue water from the extraction process in the portafilter basket 22 will be sucked back up the second conventional coffee machine through the group head shower screen 232 along with some of the ground coffee in the portafilter basket 22, when the pressure is released after the extraction. This stains the group head shower screen 232 and may clog the pores, which makes cleaning more difficult. Additionally, it should be noted that if the group head shower screen 232 is not thoroughly cleaned, the residue ground coffee and water from the previous extraction may affect the flavor of the next extraction.

SUMMARY

Therefore, an object of the disclosure is to provide a group head vortex shower that can alleviate at least one of the drawbacks of the prior art.

According to the disclosure a group head vortex shower is adapted for use in a coffee machine and includes a bottom wall, a surrounding wall and a reflection wall. The surrounding wall extends upwardly from an outer periphery of the bottom wall, surrounds a central axis, cooperates with the bottom wall to define a water inlet space, and has a plurality of outer outlets that extends therethrough and that are in fluid communication with the water inlet space. The reflection wall is sleeved around the surrounding wall, and has at least one curved inner surface that faces the outer outlets and that surrounds the central axis. Each of the outer outlets is disposed for outputting a water jet from the water inlet space in a water outlet direction towards the at least one curved inner surface of the reflection wall. An imaginary extension line extending in the water outlet direction of each of the outer outlets and the central axis are skew lines.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
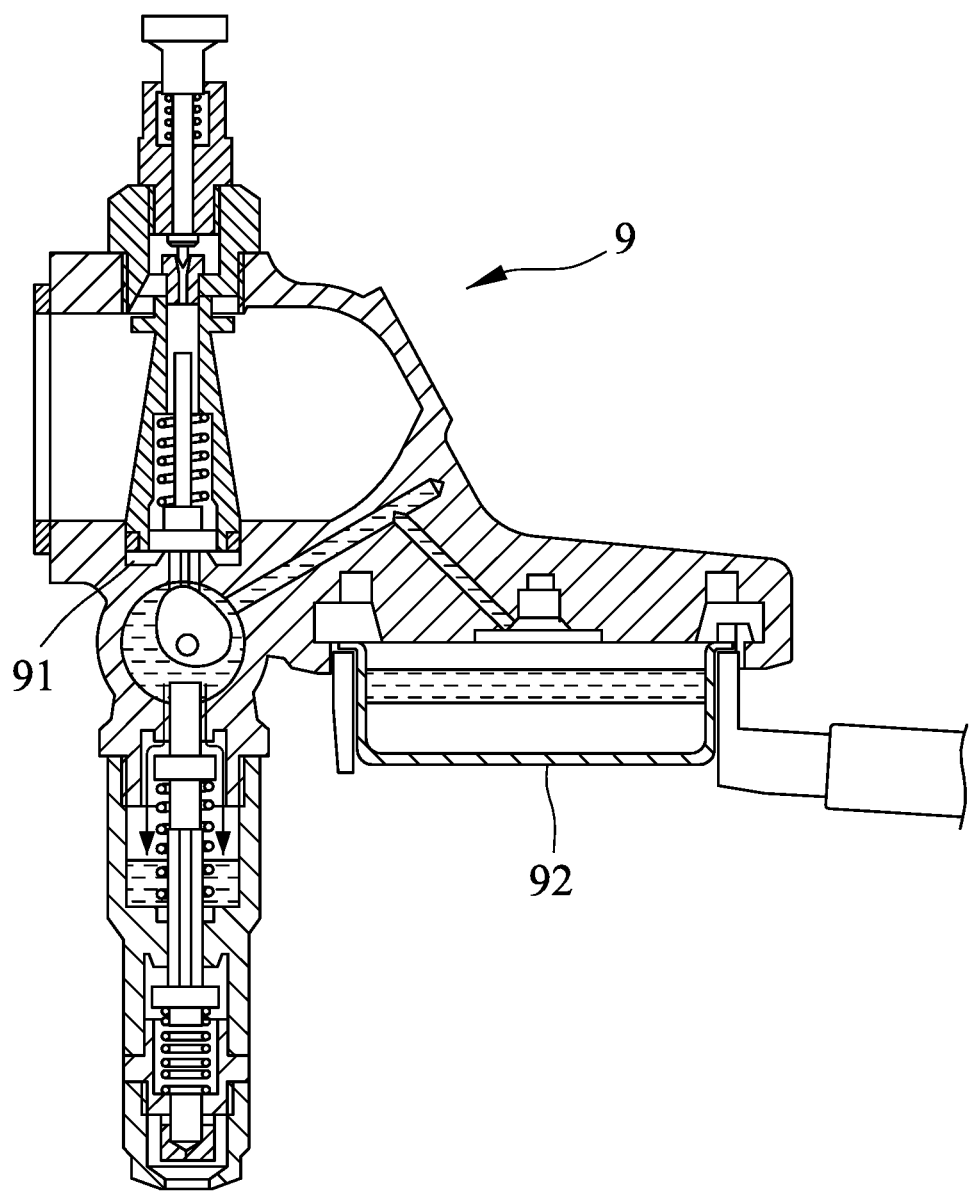
FIG. 1 is a fragmentary cross-sectional view of a conventional coffee machine.
Figure 2:
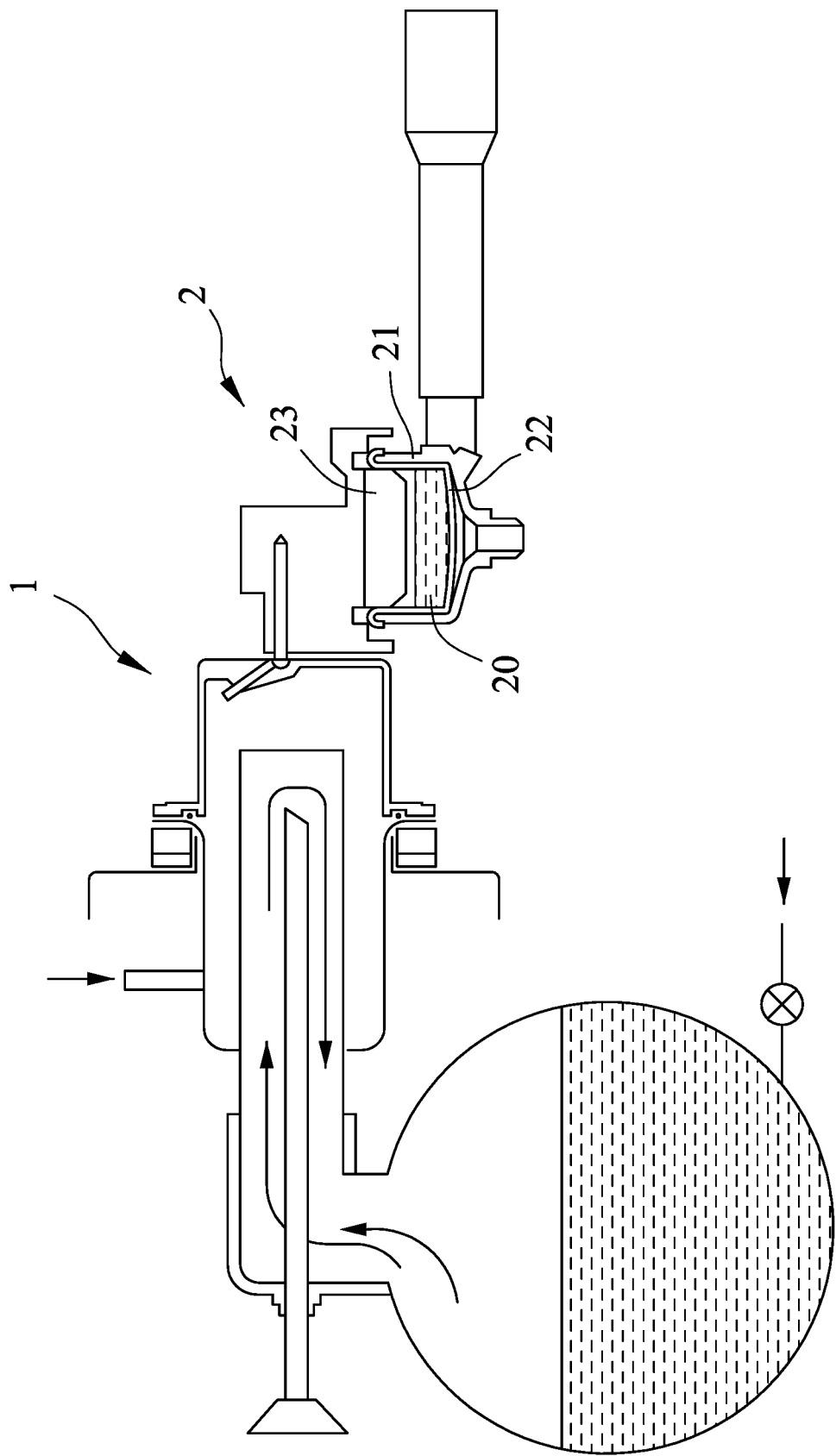
FIG. 2 is a schematic view illustrating a second conventional coffee machine.
Figure 3:
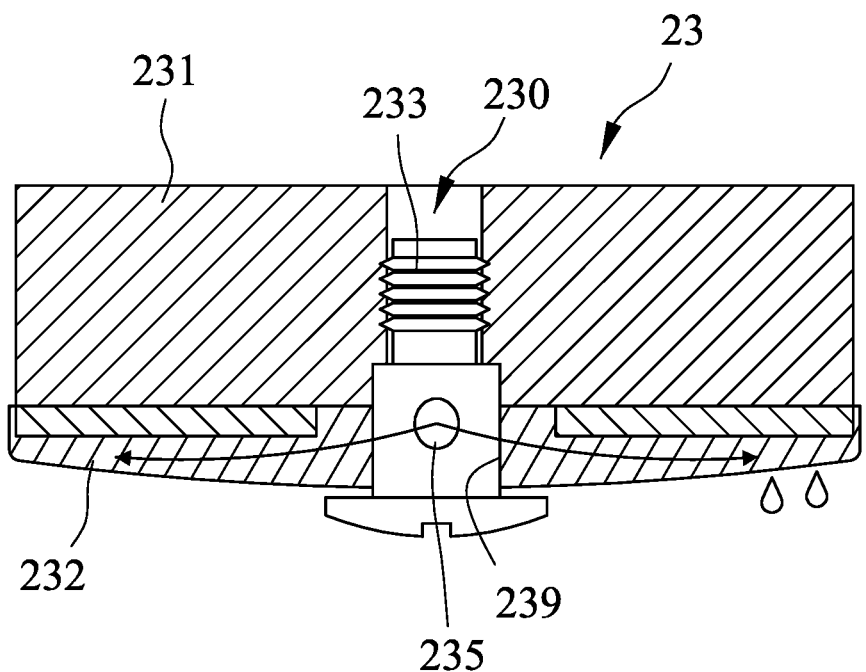
FIG. 3 is a schematic partly cross-sectional view illustrating a water diffusion module of the second conventional coffee machine.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 4:
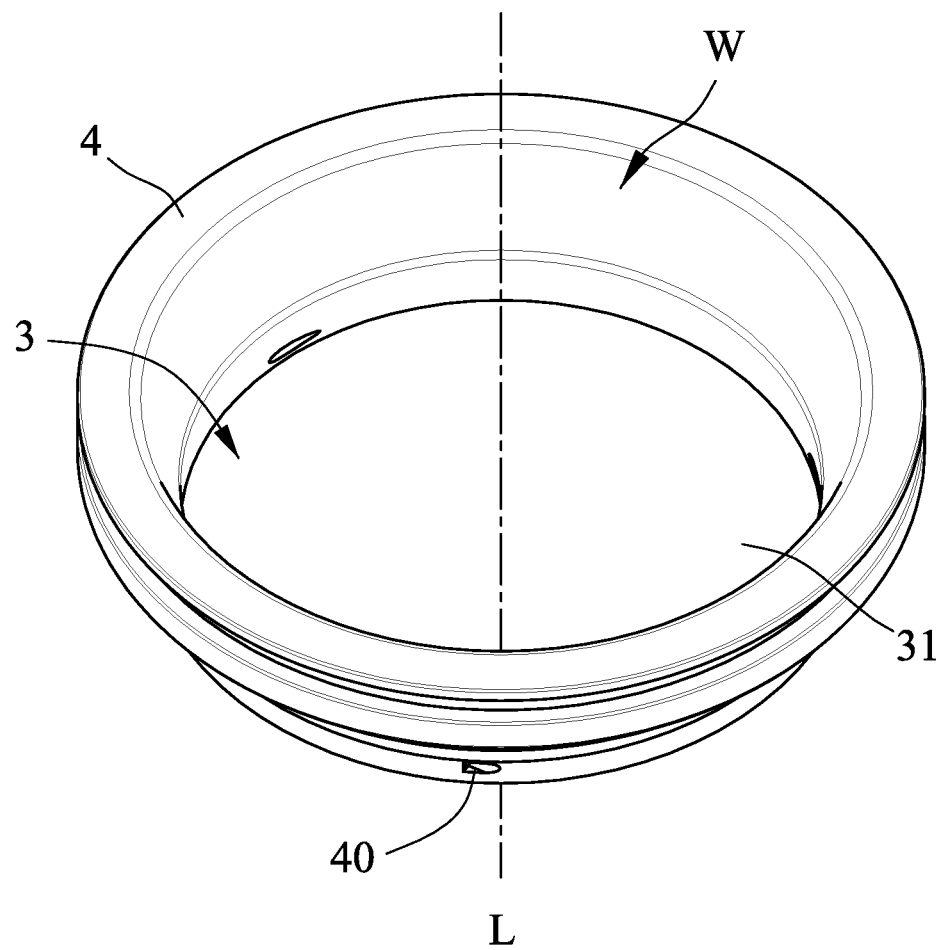
FIG. 4 is a perspective view illustrating a first embodiment of a group head vortex shower according to the present disclosure.
Figure 5:
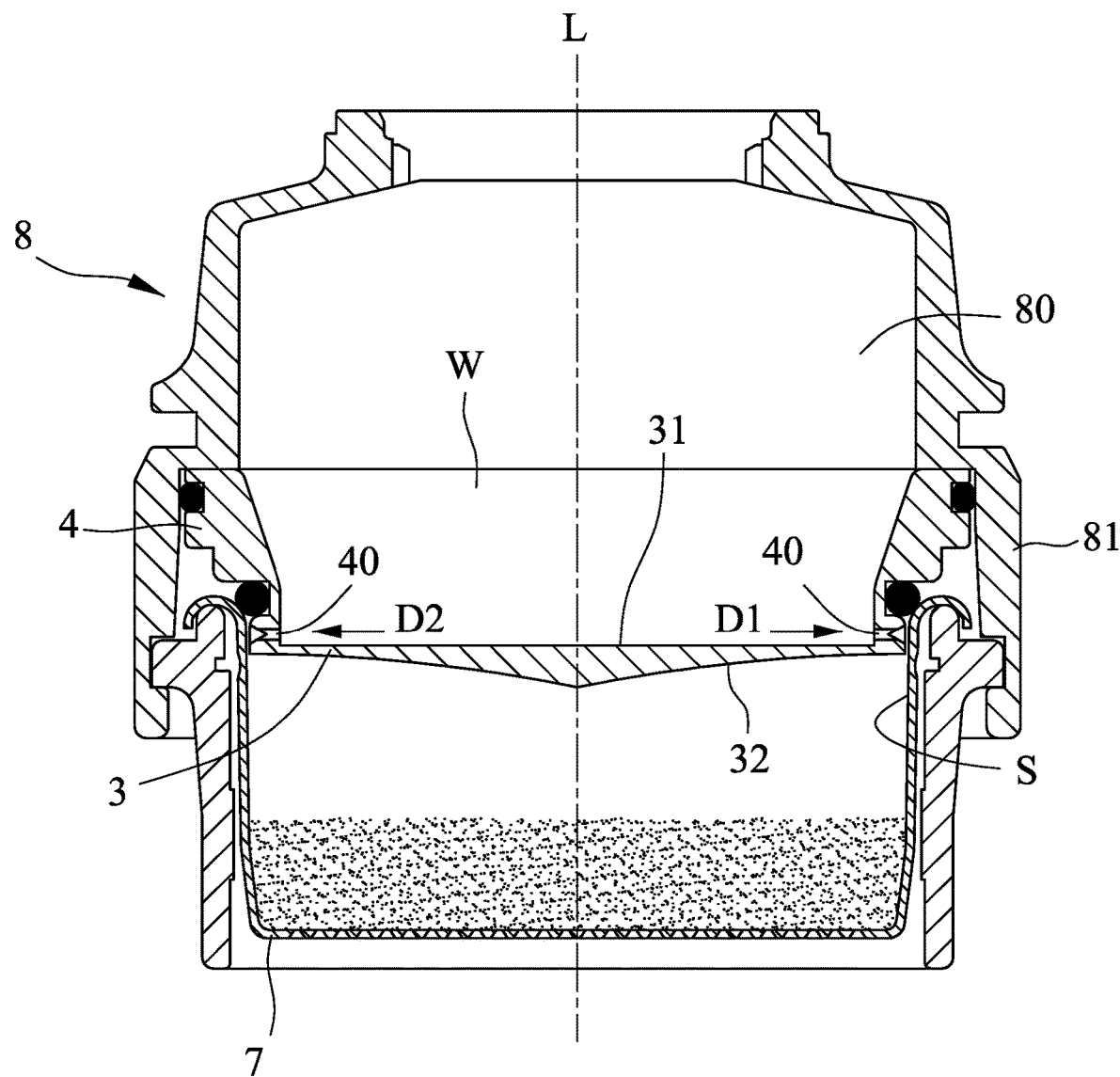
FIG. 5 is a schematic cross-sectional view illustrating the first embodiment used in a coffee machine.

FIGS. 4 and 5 show a first embodiment of a group head vortex shower according to the present disclosure. The group head vortex shower is adapted for use in a coffee machine 8. The coffee machine 8 includes a group head wall 81 that defines a group head inner space 80, and has at least one curved inner surface (S) surrounding a central axis (L). The group head vortex shower is adapted to be mounted in the group head inner space 80 of the coffee machine 8, and includes a bottom wall 3 and a surrounding wall 4 that extends upwardly from an outer periphery of the bottom wall 3, that surrounds the central axis (L), and that cooperates with the bottom wall 3 to define a water inlet space (W). More specifically, the group head wall 81 is substantially cylindrical with roughly a same diameter as the group head vortex shower that is circular in this embodiment. The coffee machine 8 used with the group head vortex shower uses high pressure water for coffee extraction, and has a water supply unit (not shown) that provides high pressure water, and a portafilter basket 7 that is adapted for holding ground coffee. The group head vortex shower diffuses the high pressure water in the coffee machine 8 to extract coffee.

The bottom wall 3 has a carrying surface 31 that faces the water inlet space (W), and a guiding surface 32 that is conical, that is opposite to said carrying surface 31, and that extends in a direction away from the water inlet space (W). In the first embodiment, the group head vortex shower is machined from a solid piece of metal to prevent structural weaknesses, and the carrying surface 31 is flat and perpendicular to the central axis (L) in order to simplify the manufacturing process.

The surrounding wall 4 has a plurality of outer outlets 40 that extend therethrough, that are in fluid communication with the water inlet space (W), and that are adapted to be adjacent to and face the at least one curved inner surface (S). Each of the outer outlets 40 is disposed for outputting a water jet from the water inlet space (W) in a water outlet direction (D1 . . . to . . . DN) towards the at least one curved inner surface (S). An imaginary extension line (L1 . . . to . . . LN) extending in the water outlet direction (D1 . . . to . . . DN) of each of the outer outlets 40 and the central axis (L) are skew lines. The water outlet direction (D1 . . . to . . . DN) will not overlap with any diameters of the curved inner surface (S). This ensures that the water jets outputted by the outer outlets 40 are not reflected by the at least one curved inner surface (S) directly backward along a diameter of the at least one curved inner surface (S). It should be especially noted that, in the first embodiment the at least one curved inner surface (S) is the inner surface of the portafilter basket 7.

Figure 6:
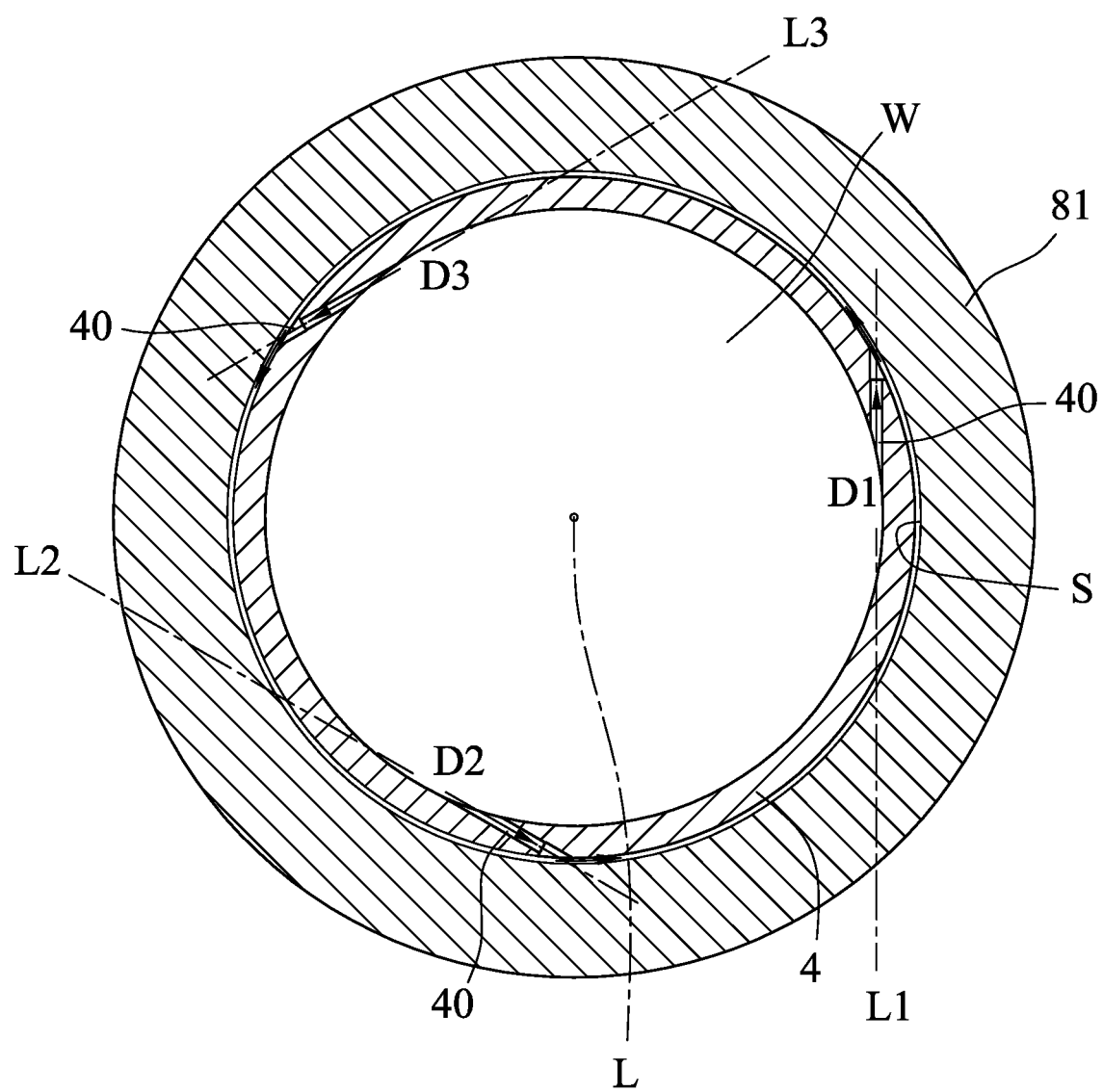
FIG. 6 is a schematic cross-sectional view illustrating water outlet directions for water jets which create a vortex in the first embodiment.

Referring to FIGS. 5 and 6, when the first embodiment is used, water in the water inlet space (W) will be pressurized and outputted as water jets from the outer outlets 40 in the water outlet direction (D1 . . . to . . . DN). Because the water jets do not strike the curved inner surface (S) perpendicularly at a point of contact, the water jets cooperate to create an agitating force that whirls around the central axis (L) and that is guided by the curved inner surface (S), thereby creating a vortex that agitates the ground coffee in the portafilter basket 7.

When compared to the conventional group head shower/diffuser that percolates water vertically downwards, the group head vortex shower creates a vortex that vigorously agitates ground coffee transversely, which may result in a more uniform and efficient extraction. With the more efficient extraction a user using the group head vortex shower is able to make coffee of the same strength using less ground coffee. Additionally, when compared to a filter screen type group head shower/diffuser which uses relatively small pores, the outer outlets 40 of the group head vortex shower are quite large, and will be less susceptible to become clogged with coffee grounds after diffusion. Additionally, it should be noted that the relatively larger outer outlets 40 are easier to clean when compared to screen type group head shower/diffusers, and the flavor of the extracted coffee may be less susceptible to be effected by residue coffee grinds. All of the above advantages allow the user to make better quality coffee using the group head vortex shower.

Figure 7:
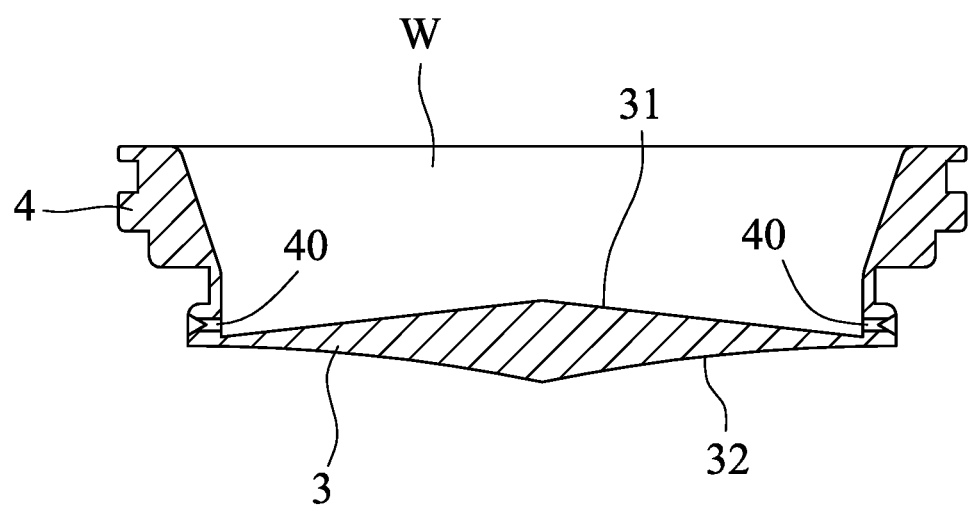
FIG. 7 is a cross-sectional view illustrating a variation of the first embodiment.

FIG. 7 shows a variation of the first embodiment, the carrying surface 31 of the bottom wall 3 is conical and extends towards the water inlet space (W). In this variation of the first embodiment the conical carrying surface 31 helps to guide water to flow towards the outer outlets 40. Additionally, the conical carrying surface 31 also prevents the accumulation of residue water after extraction.

Figure 8:
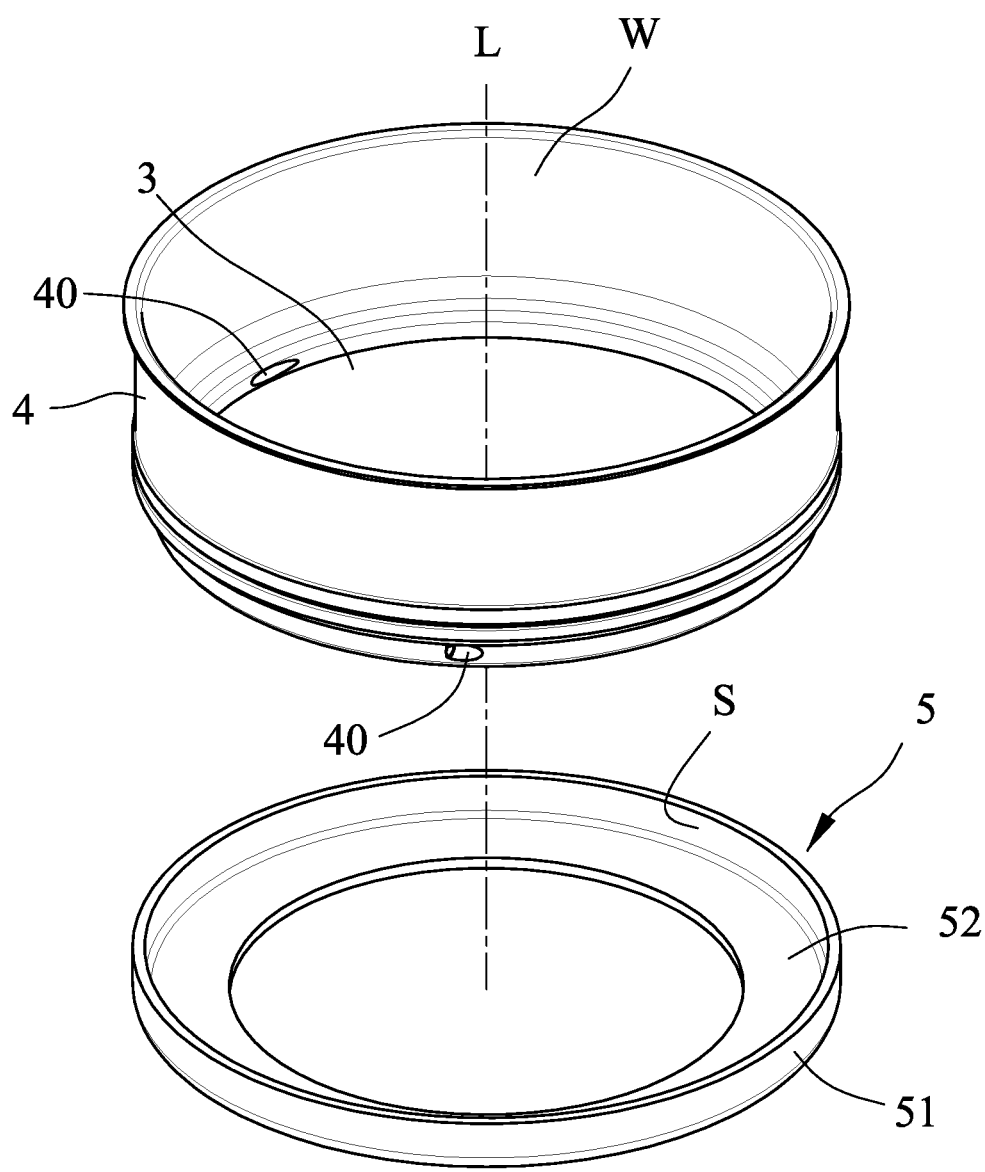
FIG. 8 is an exploded perspective view illustrating a second embodiment of the group head vortex shower according to the present disclosure.
Figure 9:
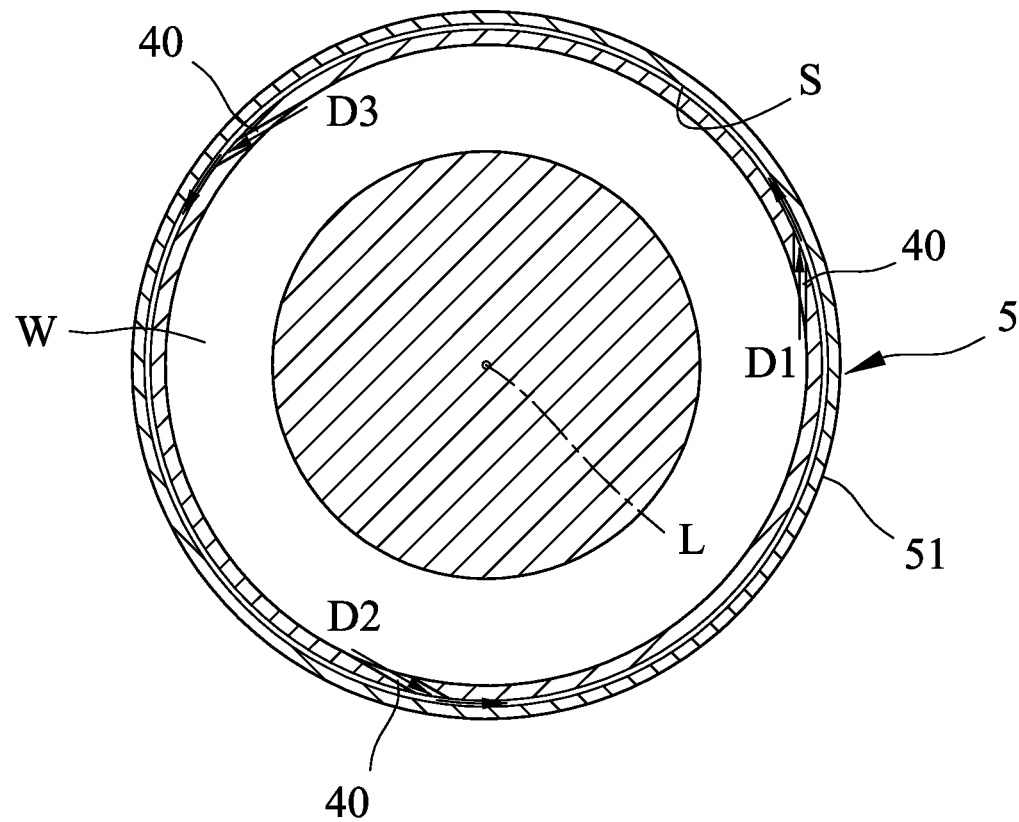
FIG. 9 is a cross-sectional view showing outer outlets and water outlet directions for water jets which create a vortex in the second embodiment.

Referring to FIG. 8, a second embodiment of the group head vortex shower includes a bottom wall 3, a surrounding wall 4, and a reflection wall 5. The surrounding wall 4 extends upwardly from an outer periphery of the bottom wall 3, surrounds a central axis (L), cooperates with the bottom wall 3 to define a water inlet space (W), and has a plurality of outer outlets 40 that extends therethrough and that are in fluid communication with the water inlet space (W). The reflection wall 5 is sleeved around the surrounding wall 4, and has at least one curved inner surface (S) that face the outer outlets 40 and that surrounds the central axis (L). Each of the outer outlets 40 is disposed for outputting a water jet from the water inlet space (W) in a water outlet direction (D1 . . . to . . . DN) towards the at least one curved inner surface (S) of the reflection wall 5 (see FIG. 9). An imaginary extension line (L1 . . . to . . . LN) extending in the water outlet direction (D1 . . . to . . . DN) of each of the outer outlets 40 and the central axis (L) are skew lines. More specifically, the reflection wall 5 may be manufactured separately, and may be welded, fused or glued to the bottom wall 3. The reflection wall 5 includes a surrounding portion 51 that surrounds the outer outlets 40, and an abutting portion 52 that is connected transversely to a lower end of the surrounding portion 51 and that abuts against the bottom wall 3 so that the reflection wall 5 is more securely affixed to the bottom wall 3. In this embodiment, the at least one curved inner surface (S) is the inner surface of the surrounding portion 51 that faces the outer outlets 40 and that surrounds the central axis (L).

It should be noted that the second embodiment has the reflection wall 5 having the at least one curved inner surface (S) that faces the outer outlets 40, while, in the first embodiment, it is the portafilter basket 7 of the coffee machine 8 that faces the outer outlets 40. The outer outlets 40 output water jets that interact with the curved inner surface (S) of the reflection wall 5 to create an agitating force that whirls around the central axis (L), thereby creating a vortex that agitates the ground coffee.

Figure 10:
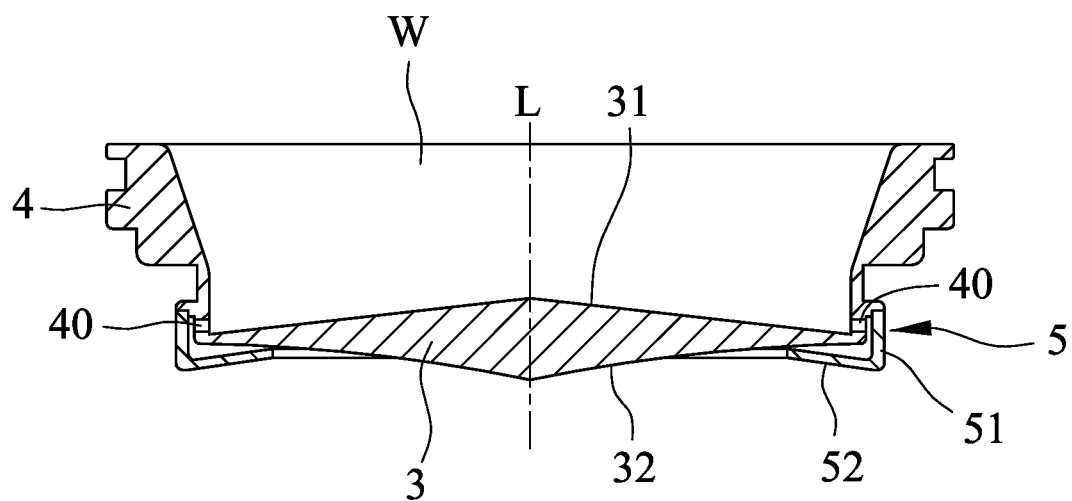
FIG. 10 is a cross-sectional view illustrating a variation of the second embodiment.

FIG. 10 shows a variation of the second embodiment, in the second embodiment the carrying surface 31 of the bottom wall 3 is flat and perpendicular to the central axis (L); however, in the variation of the second embodiment the carrying surface 31 of the bottom wall 3 is conical and extends towards the water inlet space (W). This facilitates water flow and prevents residue water from remaining in the water inlet space (W).

Figure 11:
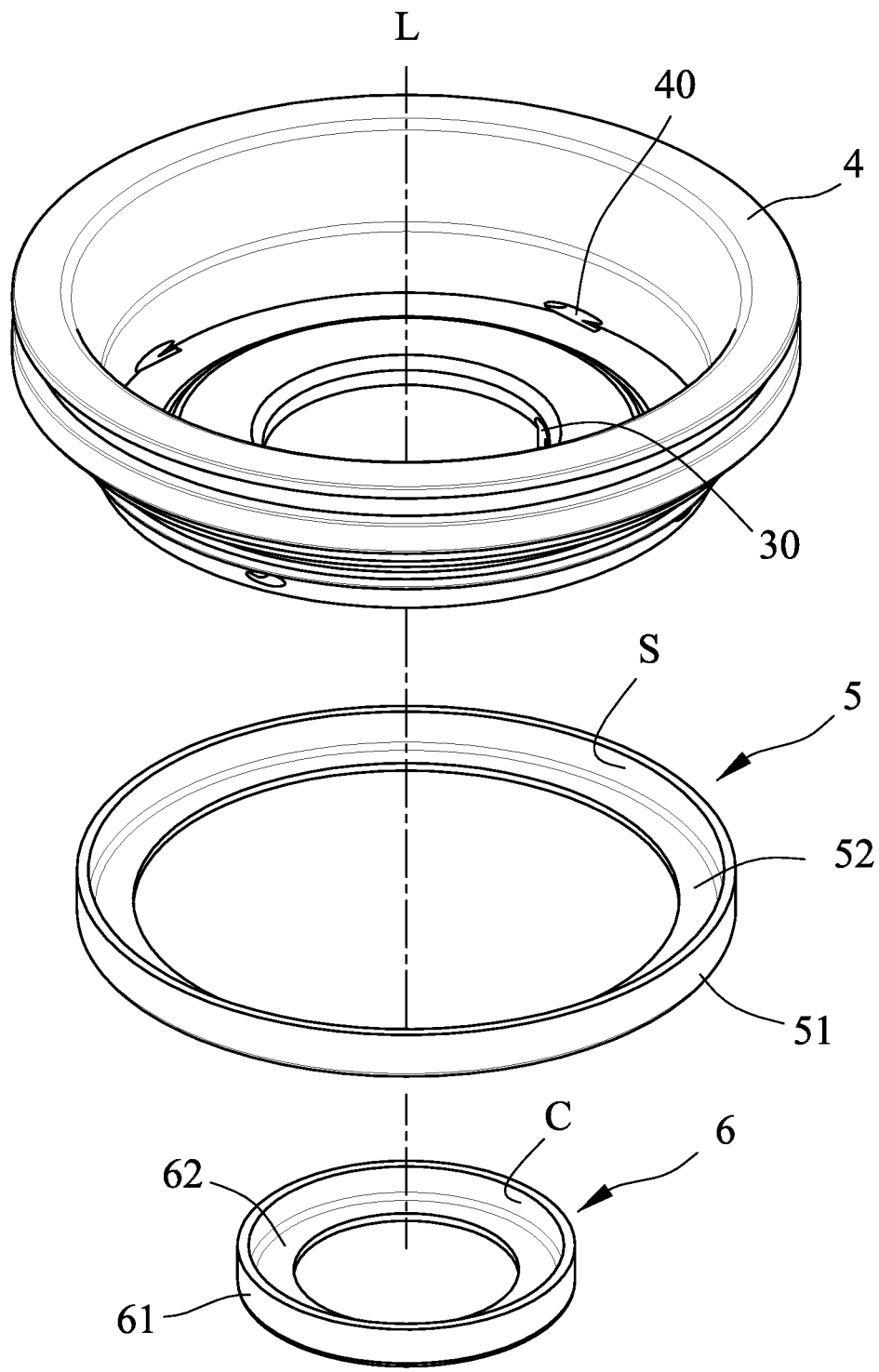
FIG. 11 is an exploded perspective view illustrating a third embodiment of the group head vortex shower according to the present disclosure.
Figure 12:
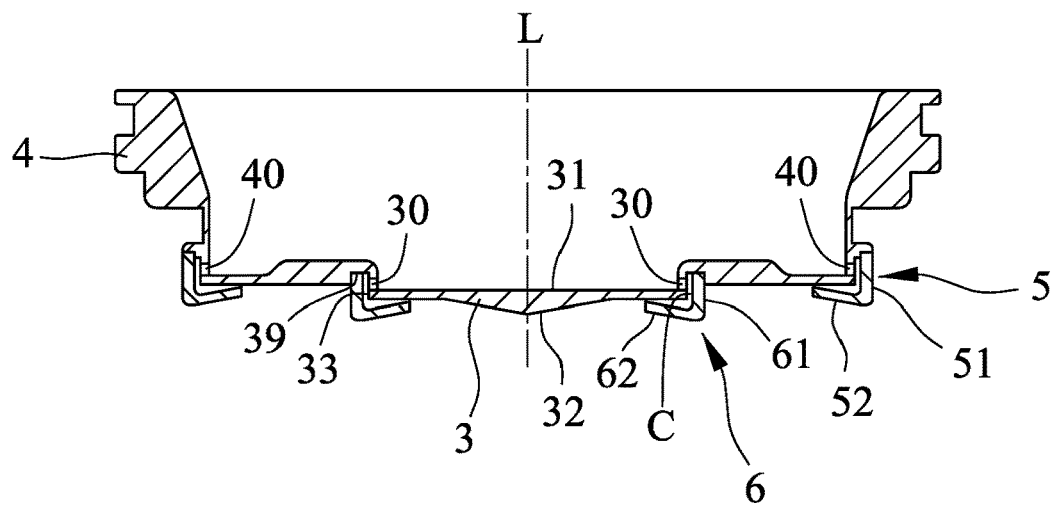
FIG. 12 is a cross-sectional view of the third embodiment.
Figure 13:
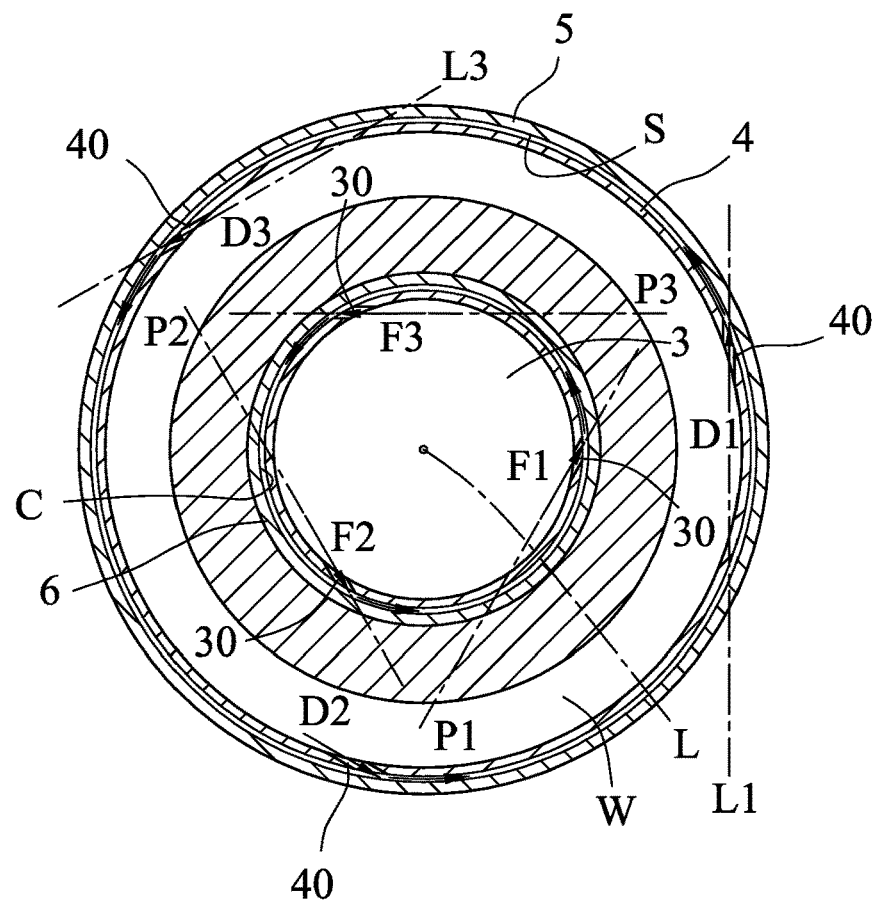
FIG. 13 is a cross-sectional view illustrating water outlet directions and water output directions of water jets that create two vortices in the third embodiment.

FIGS. 11 and 12 show a third embodiment of the group head vortex shower according to the present disclosure. The third embodiment is similar to the second embodiment; however, the third embodiment is different in that the bottom wall 3 further has a bottom ring surface 33 that surrounds the central axis (L) and that face opposite to the central axis (L), and a plurality of spout holes 30 that extend through the bottom ring surface 33 and that is in fluid communication with the water inlet space (W). The third embodiment further includes a cooperating wall 6 that is connected to the bottom wall 3. More specifically, the bottom wall 3 further has a positioning groove 39 that is recessed from a bottom surface of the bottom wall 3 and that is for mounting the cooperating wall 6. Referring to FIGS. 11 and 13, the cooperating wall 6 has at least one arcuate surface (C) that faces the spout holes 30 and that surrounds the central axis (L). Each of the spout holes 30 is disposed for outputting a water jet from the water inlet space (W) in a water output direction (F1 . . . to . . . FN) toward the at least one arcuate surface (C) of the cooperating wall 6. An imaginary extension line (P1 . . . to . . . PN) extending in the water output direction (F1 . . . to . . . FN) of each of the spout holes 30 and the central axis (L) are skew lines.

The cooperating wall 6 includes an annular portion 61 that engages the positioning groove 39 and that has the arcuate surface (C), and an abutment portion 62 that is connected transversely to a lower end of the annular portion 61 and that abuts against the bottom wall 3. In this embodiment, the at least one arcuate surface (C) is the inner surface of the annular portion 61 that faces the spout holes 30 and that surrounds the central axis (L). The cooperating wall 6 may be mounted via fusing, welding or gluing to the bottom wall 3 so that the annular portion 61 of the cooperating wall 6 is mounted in the positioning groove 39 of the bottom wall 3.

Compared to the second embodiment, the third embodiments is able to output an additional set of water jets closer to the central axis (L). The water jets contact the arcuate surface (C) of the cooperating wall 6 and from an additional vortex closer to the central axis (L). This helps to agitate the ground coffee even more vigorously then the second embodiment as there are now two vortices, one formed from water jets outputted from the outer outlets 40 and created upon contact with the curved inner surface (S) that is more distal to the central axis (L), and another one formed from water jets issued from the spout holes 30 and created upon contacting the arcuate surface (C) that is more proximate to the central axis (L). This will not only agitate the ground coffee more vigorously, but also, make the agitation more uniform.

In summary of the above, in the group head vortex shower of the present disclosure the outer outlets 40 are able to output water jets that interact with the curved inner surface (S) of either the portafilter basket 7 or the reflection wall 5, and the spout holes 30 are able to output water jets that interact with the arcuate surface (C), thereby creating a vortices to uniformly agitate ground coffee in the portafilter basket 7 and optimize coffee extraction. Additionally, the outer outlets 40 and the spout holes 30 of the group head vortex shower are larger and easier to clean when compared to conventional group head screen showers that have small pores. This ensures the extracted coffee will not be affected by residue coffee grounds and affect user satisfaction.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A group head vortex shower adapted for use in a coffee machine, the coffee machine including a group head wall that defines a group head inner space and that has at least one curved inner surface, said group head vortex shower being adapted to be mounted in the group head inner space of the coffee machine and comprising:
   a bottom wall;
   a surrounding wall extending upwardly from an outer periphery of said bottom wall, surrounding a central axis, and cooperating with said bottom wall to define a water inlet space, said surrounding wall having a plurality of outer outlets that extend therethrough, that are in fluid communication with said water inlet space, and that are adapted to be adjacent to the at least one curved inner surface of the group head wall;
   wherein each of said outer outlets is disposed for outputting a water jet from said water inlet space in a water outlet direction towards the at least one curved inner surface of the group head wall; and wherein an imaginary extension line extending in said water outlet direction of each of said outer outlets and the central axis are skew lines.

2. The group head vortex shower as claimed in claim 1, wherein said bottom wall has a carrying surface that faces said water inlet space, and a guiding surface that is conical, that is opposite to said carrying surface, and that extends in a direction away from said water inlet space.

3. The group head vortex shower as claimed in claim 2, wherein said carrying surface of said bottom wall is flat and perpendicular to the central axis.

4. The group head vortex shower as claimed in claim 2, wherein said carrying surface of said bottom wall is conical and extends towards said water inlet space.

5. A group head vortex shower adapted for use in a coffee machine and comprising:
   a bottom wall;
   a surrounding wall extending upwardly from an outer periphery of said bottom wall, surrounding a central axis, cooperating with said bottom wall to define a water inlet space, and having a plurality of outer outlets that extend therethrough and that are in fluid communication with said water inlet space; and
   a reflection wall sleeved around said surrounding wall, and having at least one curved inner surface that faces said outer outlets and that surrounds the central axis;
   wherein each of said outer outlets is disposed for outputting a water jet from said water inlet space in a water outlet direction towards said at least one curved inner surface of said reflection wall; and
   wherein an imaginary extension line extending in said water outlet direction of each of said outer outlets and the central axis are skew lines.

6. The group head vortex shower as claimed in claim 5, wherein said bottom wall has a carrying surface that faces said water inlet space, and a guiding surface that is conical, that is opposite to said carrying surface, and that extends in a direction away from said water inlet space.

7. The group head vortex shower as claimed in claim 6, wherein said carrying surface of said bottom wall is flat and perpendicular to the central axis.

8. The group head vortex shower as claimed in claim 6, wherein said carrying surface of said bottom wall is conical and extends towards said water inlet space.

9. The group head vortex shower as claimed in claim 5, wherein:
   said bottom wall has a bottom ring surface that surrounds the central axis and that faces opposite to the central axis, and a plurality of spout holes that extend through said bottom ring surface and that is in fluid communication with said water inlet space;
   said group head vortex shower further comprises a cooperation wall connected to said bottom wall, and having at least one arcuate surface that faces said spout holes and that surrounds the central axis;
   each of said spout holes is disposed for outputting a water jet from said water inlet space in a water output direction toward said at least one arcuate surface of said cooperating wall; and
   an imaginary extension line extending in said water output direction of each of said spout holes and the central axis are skew lines.

10. The group head vortex shower as claimed in claim 9, wherein said bottom wall further has a positioning groove that is recessed from a bottom surface of said bottom wall and that is for mounting said cooperating wall.

11. The group head vortex shower as claimed in claim 10, wherein said cooperating wall includes an annular portion that engages said positioning groove and that has said arcuate surface, and an abutment portion that is connected transversely to a lower end of said annular portion and that abuts against said bottom wall.

12. The group head vortex shower as claimed in claim 5, wherein said reflection wall includes a surrounding portion that surrounds said outer outlets and that has said at least one curved inner surface, and an abutting portion that is connected transversely to a lower end of said surrounding portion and that abuts against said bottom wall.

* * * * *